United States Patent
Shimizu et al.

(10) Patent No.: US 10,135,374 B2
(45) Date of Patent: Nov. 20, 2018

(54) PERMANENT MAGNET MOTOR, POSITION ESTIMATING DEVICE, AND MOTOR DRIVING CONTROLLING DEVICE

(71) Applicants: Fumihiro Shimizu, Kanagawa (JP); Takashi Hashimoto, Kanagawa (JP); Hiroshi Koide, Kanagawa (JP)

(72) Inventors: Fumihiro Shimizu, Kanagawa (JP); Takashi Hashimoto, Kanagawa (JP); Hiroshi Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/222,134

(22) Filed: Jul. 28, 2016

(65) Prior Publication Data

US 2017/0040918 A1 Feb. 9, 2017

(30) Foreign Application Priority Data

Aug. 3, 2015 (JP) ................. 2015-153405

(51) Int. Cl.
| | |
|---|---|
| *H02K 37/10* | (2006.01) |
| *H02P 21/18* | (2016.01) |
| *H02K 21/14* | (2006.01) |
| *H02K 21/16* | (2006.01) |
| *H02K 1/27* | (2006.01) |
| *H02K 1/24* | (2006.01) |

(52) U.S. Cl.
CPC ........... *H02P 21/18* (2016.02); *H02K 1/2733* (2013.01); *H02K 21/145* (2013.01); *H02K 21/16* (2013.01); *H02K 1/246* (2013.01)

(58) Field of Classification Search
CPC .......... H02K 1/46; H02K 21/16; H02K 21/14; H02K 29/06; H02K 1/223; H02K 29/12; H02K 1/06; H02K 1/27; H02K 21/00; H02K 37/10; H02P 27/04; H02P 21/00; H02P 8/00

USPC .......... 310/156.23, 156.77, 156.78, 216.069, 310/49.28, 49.32, 49.46, 49.53, 152, 310/154.21, 181, 211; 318/400.01, 700, 318/701, 400.32, 685, 696, 727

See application file for complete search history.

(56) References Cited

U.S. PATENT DOCUMENTS

| | | | |
|---|---|---|---|
| 5,510,662 A | 4/1996 | Tanimoto et al. | |
| 6,160,330 A * | 12/2000 | Sakamoto | H02K 37/18 310/112 |
| 6,225,773 B1 * | 5/2001 | Sakamoto | H02K 37/18 318/685 |

(Continued)

FOREIGN PATENT DOCUMENTS

| | | |
|---|---|---|
| JP | H06-339241 | 12/1994 |
| JP | 2011-109848 | 6/2011 |

*Primary Examiner* — Antony M Paul
(74) *Attorney, Agent, or Firm* — Harness, Dickey & Pierce, P.L.C.

(57) ABSTRACT

To manufacture a permanent magnetic motor having saliency at a low cost, a permanent magnet motor includes a stator provided with an armature winding configured to form a plurality of phases, a rotor having a surface facing the stator, the rotor including a permanent magnet disposed to face the stator, the permanent magnet having a plurality of magnetic poles arranged in a circumferential direction of the rotor, and a conductive member made of a conductive material and disposed on the surface of the rotor facing the stator.

18 Claims, 17 Drawing Sheets

(56) References Cited

U.S. PATENT DOCUMENTS

| | | | |
|---|---|---|---|
| 6,903,476 B2 * | 6/2005 | Sakamoto | H02K 29/03 |
| | | | 310/156.64 |
| 6,969,930 B2 * | 11/2005 | Lin | H02K 37/18 |
| | | | 310/180 |
| 8,258,731 B2 | 9/2012 | Shimizu | |
| 8,288,978 B2 | 10/2012 | Shimizu | |
| 8,405,329 B2 | 3/2013 | Shimizu | |
| 8,860,346 B2 | 10/2014 | Shimizu et al. | |
| 8,866,421 B2 | 10/2014 | Kamatani et al. | |
| 8,872,453 B2 | 10/2014 | Kamatani et al. | |
| 9,013,083 B2 * | 4/2015 | Morita | H02K 1/146 |
| | | | 310/156.23 |
| 2009/0184598 A1 * | 7/2009 | Nakano | G01D 5/2046 |
| | | | 310/156.78 |
| 2013/0325187 A1 | 12/2013 | Shimizu et al. | |
| 2014/0365167 A1 | 12/2014 | Shimizu | |
| 2015/0009517 A1 | 1/2015 | Shimizu | |
| 2015/0112634 A1 | 4/2015 | Shimizu | |
| 2015/0176965 A1 | 6/2015 | Shimizu | |
| 2015/0318774 A1 * | 11/2015 | Tremelling | H02K 21/042 |
| | | | 310/68 B |
| 2016/0011009 A1 | 1/2016 | Shimizu et al. | |

* cited by examiner

PERMANENT MAGNET MOTOR, POSITION ESTIMATING DEVICE, AND MOTOR DRIVING CONTROLLING DEVICE

CROSS-REFERENCE TO RELATED APPLICATIONS

The present application claims priority under 35 U.S.C. § 119 to Japanese Patent Application No. 2015-153405, filed Aug. 3, 2015. The contents of which are incorporated herein by reference in their entirety.

BACKGROUND OF THE INVENTION

1. Field of the Invention

The present disclosure relates to permanent magnet motors, position estimating devices, and motor driving controlling devices.

2. Description of the Related Art

Conventionally, permanent magnet motors which do not consume electricity for field system are widely in use as high-efficiency motors. Among permanent magnet motors, an interior permanent magnet (IPM) motor having permanent magnets implanted inside rotors have a property called saliency, with which a coil inductance changes in accordance with a rotor angle. Such an IPM motor thereby takes advantages of not only magnetic torque created by magnetic flux of permanent magnets but also reluctance torque created by saliency, which enables an IPM motor to achieve high efficiency and a wide range of speed, and therefore the range of use of an IPM motor has become enlarged recently.

Moreover, an IPM motor is employed for a sensor-less driver and a sensor-less angle detector which detects rotor angles without using a rotating sensor but using saliency.

A rotor of an IPM motor is designed to have slits for inserting permanent magnets inside the core that forms the rotor and to have airspace properly arranged inside the core for avoiding magnetic flux easily going through, so as to acquire higher saliency. Such a design of an IPM motor is described, for example, in Japanese Unexamined Patent Application Publication No. H06-339241.

However, a core of a rotor of an IMP motor is manufactured by stamping out thin electromagnetic copper plates in the cross-sectional shape of the rotor and, for example, swaging at least several dozen layers of the stamped copper plates, which requires a number of manufacturing processes and high cost.

SUMMARY OF THE INVENTION

One aspect of the present invention is a permanent magnet motor which includes a stator provided with an armature winding configured to form a plurality of phases, a rotor having a surface facing the stator, the rotor including a permanent magnet disposed to face the stator, the permanent magnet having a plurality of magnetic poles arranged in a circumferential direction of the rotor, and a conductive member made of a conductive material and disposed on the surface of the rotor facing the stator.

DESCRIPTION OF THE EMBODIMENTS

The disclosed art intends to manufacture a permanent magnetic motor having saliency at a lower cost in view of aforementioned background.

First Embodiment

Figure 1:
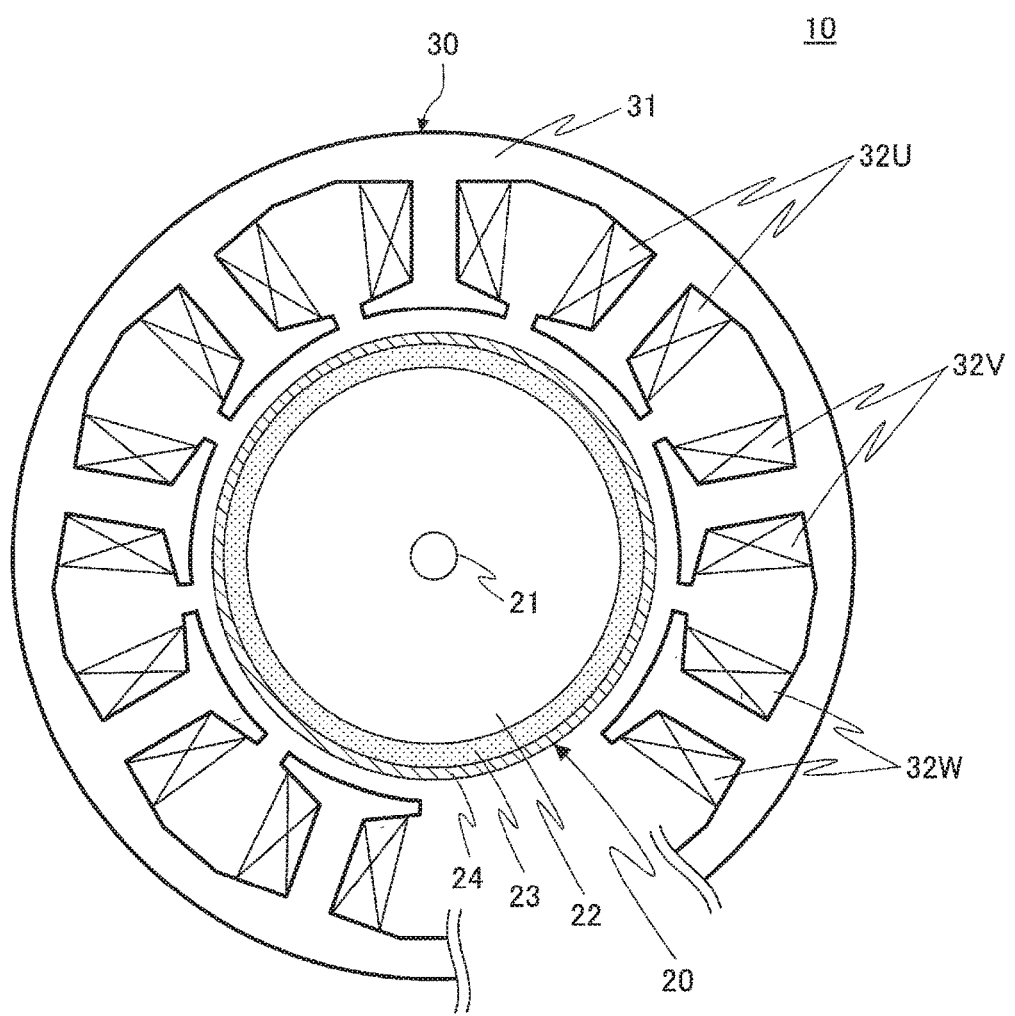
FIG. 1 is a first drawing describing a permanent magnetic motor according to a first embodiment.
Figure 2:
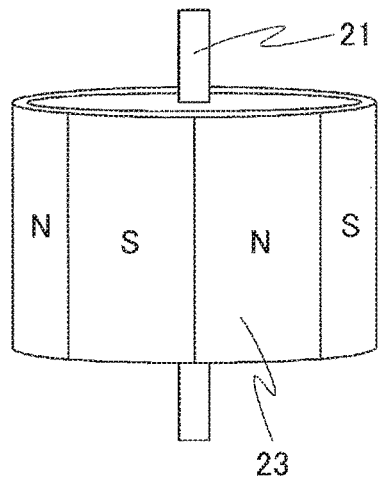
FIG. 2 is a second drawing describing the permanent magnetic motor according to the first embodiment.
Figure 3:
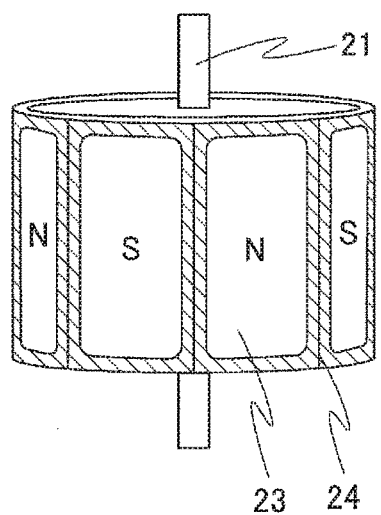
FIG. 3 is a third drawing describing the permanent magnetic motor according to the first embodiment.

In the following, the first embodiment will be described with reference to drawings. A permanent magnet motor 10 according to the first embodiment will be described with reference to FIG. 1 through FIG. 3. FIG. 1 is the first drawing describing the permanent magnet motor 10 according to the first embodiment, which illustrates a cross-sectional view of an aspect perpendicular to a shaft 21 of the permanent magnet motor 10. FIG. 2 is the second drawing describing the permanent magnet motor 10 according to the first embodiment, which illustrates a permanent magnet 23 provided on a rotor 20. FIG. 3 is the third drawing describing the permanent magnet motor 10 according to the first embodiment, which illustrates a conductive member 24 provided on the rotor 20.

The permanent magnet motor 10 according to the first embodiment includes the rotor 20, the shaft 21, and a stator 30.

The rotor 20 according to the first embodiment is provided with the shaft 21, a yoke 22, the permanent magnet 23, and the conductive member 24, so as to be rotatable upon an axis of the shaft 21.

The shaft 21 is the axis, or the center, of the rotation of the rotor 20, which is attached to a bearing (not illustrated in the drawing), etc., so as to be rotatable.

The yoke 22 is in a cylindrical shape having base end surfaces perpendicular to the shaft 21, which is attached to the shaft 21 so as to rotate along with the shaft 21.

As illustrated in FIG. 2, the permanent magnet 23, which is a bonded magnet in a shape of a single ring magnetized so as to have multiple magnetic poles in the circumferential direction, is attached to the outer circumference of the yoke 22.

A bonded magnet can be manufactured at a low cost by press-molding or injection-molding. Moreover, the bonded magnet according to the first embodiment is in the shape of a single ring, and therefore provides benefits of requiring less manufacturing processing and decreasing the possibility of being scattered by centrifugal force.

The conductive member 24 according to the first embodiment is a non-magnetic electrical conductor attached on the circumferential surface of the permanent magnet 23 and, as illustrated in FIG. 3, arranged in annular shapes around each rim of the magnetic poles of the permanent magnet 23 so as to have openings, which forms an electrical closed circuit. Here, positions of the openings corresponding to the positions of the magnetic poles of the permanent magnet 23 are not limited to the positions as described in the first embodiment.

In the first embodiment, a non-magnetic electrical conductor is employed for the conductive member 24, so that the attachment of the conductive member 24 does not significantly affect the magnetic circuit of the permanent magnet motor 10. Further, as described hereinafter, the permanent magnet motor 10 obtains saliency responding to the attachment of the conductive member 24.

The stator 30 of the first embodiment, provided so as to surround the outer circumference of the rotor 20, includes a stator core 31 and stator coils 32U, 32V, and 32W. In the following description, the stator coils 32U, 32V, and 32W are simply referred to as the stator coils 32 unless otherwise specified.

The stator core 31 is manufactured by layering thin electromagnetic copper plates in the length direction of the shaft 21. The stator core 31 circularly surrounds the outer circumference of the rotor 20 and, on the inner circumference, multiple T-shaped parts called teeth are provided in the circumferential direction. The number of teeth in the first embodiment is nine.

The stator coils 32 (or armature windings) are coils wound on the teeth. The stator coils 32 according to the first embodiment include three phases, that is, U, V, and W, having electric phase differences of 120 degrees, and the stator coils 32 having the phases are wound on the respective teeth in such an order as U, V, W, U, V, W . . . . In the first embodiment, three stator coils 32 per phase, which are connected in series, are provided in the circle.

Next, the effect of the attachment of the conductive member 24 will be explained.

In general, a motor with a rotor having a ring-shaped permanent magnet does not have saliency which is a property with which a coil inductance changes in accordance with a rotor angle. This is because the permanent magnet is in the shape of a ring, which means that the angle of the rotor does not affect the airspace between the rotor and the stator.

Figure 4:
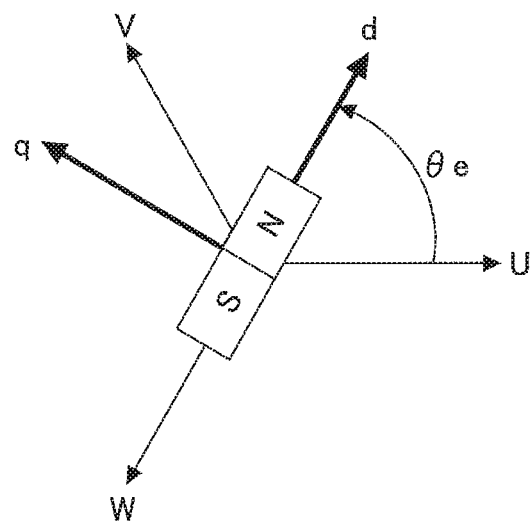
FIG. 4 is a drawing illustrating coordinate systems of UVW-axes and dq-axes according to the first embodiment.

In the following, an emerging of saliency according to the first embodiment will be described with reference to FIG. 4 through FIG. 6. FIG. 4 is a drawing illustrating coordinate systems of UVW-axes and dq-axes. The UVW-axes form a coordinate system, mutually having electric phase differences of 120 degrees, and the dq-axes form a rotating orthogonal coordinate system, where the d-axis, which is a direction of a north pole of the permanent magnet 23, is situated at a rotor position angle θe (an electric angle) of the rotor 20.

Here, a circuit diagram of the permanent magnet motor 10 according to the first embodiment, where the coordinate system is transformed from the UVW-axes to the dq-axes, will be described with reference to FIG. 5 and FIG. 6.

Figure 5:
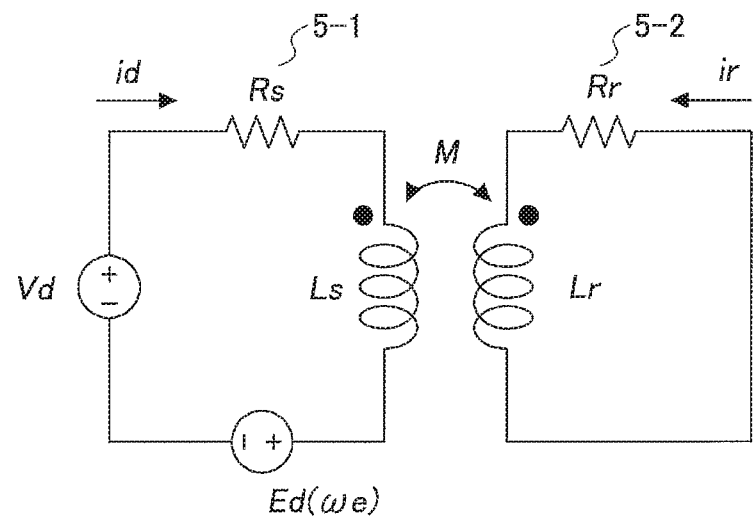
FIG. 5 is a circuit diagram indicating the d-axis component according to the first embodiment.

FIG. 5 is a circuit diagram indicating the d-axis component. A closed circuit 5-1 is a circuit diagram of the stator 30. The following Formula 1 is a circuit equation expressing the d-axis component of the stator coil 32.

[Formula 1]

$$Vd = Rs * id + Ls\frac{did}{dt} + M\frac{dir}{dt} + Ed(\omega e) \qquad (1)$$

Here, in Formula 1, Rs is a resistance value of the stator coil 32, Ls is a coil inductance, Vd is a d-axis applying voltage, which is the d-axis component of a voltage applied to a coil terminal (not illustrated), and id is a d-axis current, which is the d-axis component of a current supplied to the closed circuit 5-1. Further, in Formula 1, Ed (ωe) is a d-axis electromotive force, which is an electromotive force proportional to a motor speed ωe, M is a mutual-inductance between the closed circuit 5-1 and a later-described closed circuit 5-2 of the conductive member 24. Here the relation between the rotor position angle θe (an electric angle) and the rotor speed ωe is expressed by the Formula 2 below.

[Formula 2]

$$\omega e = \frac{d\theta e}{dt} \qquad (2)$$

The closed circuit 5-2 is a circuit diagram of the conductive member 24. The circuit equation of the closed circuit 5-2 is expressed by the Formula 3 below.

[Formula 3]

$$0 = Rr * ir + Lr\frac{dir}{dt} + M\frac{did}{dt} \qquad (3)$$

Here, in Formula 3, ir is a current supplied to the closed circuit 5-2, and Lr is a self-inductance of the closed circuit 5-2.

Figure 6:
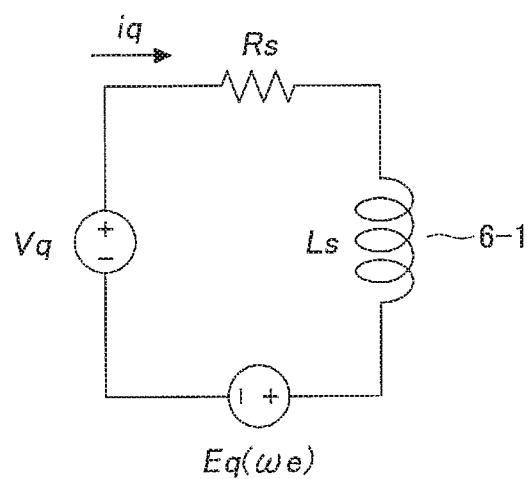
FIG. 6 is a circuit diagram indicating the q-axis component according to the first embodiment.

FIG. 6 is a circuit diagram indicating the q-axis component. The conductive member 24 according to the first embodiment has an opening in the region corresponding to the center of magnetic poles, so that the closed circuit 6-1 of the conductive member 24 does not affect the q-axis.

The following Formula 4 is a circuit equation expressing the q-axis component of the stator coil 32.

[Formula 4]

$$Vq = Rs * iq + Ls\frac{diq}{dt} + Eq(\omega e) \qquad (4)$$

In Formula 4, Vq is a q-axis applying voltage, which is the q-axis component of a voltage applied to the coil terminal (not illustrated), and iq is a q-axis current, which is the q-axis component of a current supplied to the closed circuit 6-1. Further, in Formula 4, Ed (ωe) is a q-axis electromotive force, which is an electromotive force proportional to a motor speed ωe. Here, in the case where there is no saliency, self-inductances of the d-axis and the q-axis are the same.

By the way, the method for estimating a rotor position using saliency is intended to be used when the rotating speed of a motor is in the range of halting to low-speed. Specifically, in the method for estimating a rotor position using saliency, a harmonic wave signal is superimposed on a voltage for driving a rotation of a motor, and then a harmonic wave current which is included in a coil current as the response to the harmonic wave signal is detected, so as to estimate a rotor positon and a rotor speed based on the harmonic wave signal and the harmonic wave current.

Therefore, considering that the voltage applied to the stator coil 32 consists mostly of a harmonic wave signal and the rotor speed ωe is low, Formula 1 and Formula 4 are approximated by Formula 5 and Formula 6 below, respectively.

[Formula 5]

$$Vd = Ls\frac{did}{dt} + M\frac{dir}{dt} \qquad (5)$$

[Formula 6]

$$Vq = Ls\frac{diq}{dt} \qquad (6)$$

Furthermore, Formula 3, Formula 5, and Formula 6 are simplified to Formula 7 below expressing a saliency ratio λ, which is a ratio of a q-axis inductance and a d-axis inductance.

[Formula 7]

$$\lambda = 1 + \frac{M^2}{LsLr - M^2} \qquad (7)$$

That is to say, in the first embodiment, the d-axis inductance is affected by a mutual-inductance generated between the stator coil 32 and the closed circuit of the conductive member 24 in the d-axis, and therefore saliency emerges.

Further, the motor is not limited to an inner rotor type motor as illustrated in the drawings of the first embodiment, but also includes an outer rotor type motor.

As described above, the permanent magnet motor 10 according to the first embodiment is provided with the bonded magnet in the shape of a single ring on the rotor 20, and the non-magnetic conductive member 24 that forms a closed circuit on the surface of the bonded magnet, and therefore a permanent magnet motor with saliency can be manufactured at a low cost.

Second Embodiment

In the following, the second embodiment will be described with reference to a drawing. In the second embodiment, only a conductive member 25 differs from the first embodiment. Hence, in the description of the second embodiment, the elements having the same configurations as in the first embodiment are assigned with the same reference signs as assigned in the first embodiment, in order to omit repeated explanations.

Figure 7:
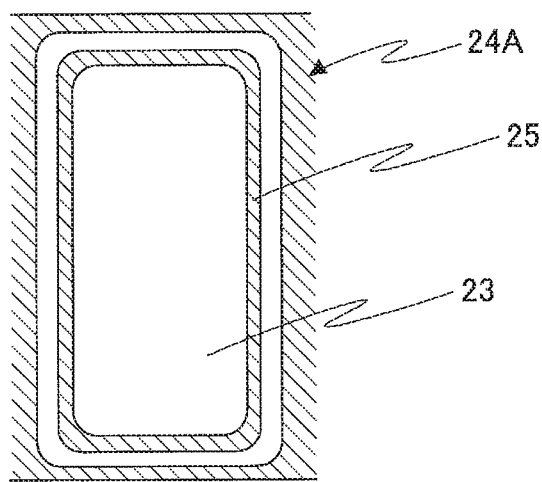
FIG. 7 is a drawing describing a conductive member according to a second embodiment.

FIG. 7 is a drawing describing conductive members 24A and 25 according to the second embodiment. The conductive member 24A includes the conductive member 25 in addition to each part of the conductive member 24 according to the first embodiment.

As illustrated in FIG. 7, the conductive member 25 is a conductor provided on the surface of the permanent magnet 23 just as the conductive member 24. The conductive member 25 is in a annular shape arranged inside the opening of the conductive member 24A, which forms an electrical closed circuit. Here, the number of the conductive members 25 provided inside the conductive member 24A is not limited to two.

With such a configuration, the effect on the d-axis inductance is increased, which means higher saliency is obtained.

Here, a circuit diagram of the conductive member 25 according to the second embodiment corresponds to the closed circuit 5-2 in the first embodiment.

As described above, in the second embodiment, inside the conductive member 24A which is in a annular shape and forms an electrical closed circuit, the conductive member 25 which is similarly in a annular shape is provided, and therefore a permanent magnet motor with a high saliency ratio can be manufactured at a low cost.

Third Embodiment

In the following, the third embodiment will be described with reference to drawings. In the third embodiment, only a conductive member 241B differs from the first embodiment. Hence, in the description of the third embodiment, the elements having the same configurations as in the first embodiment are assigned with the same reference signs as assigned in the first embodiment, in order to omit repeated explanations.

Figure 8:
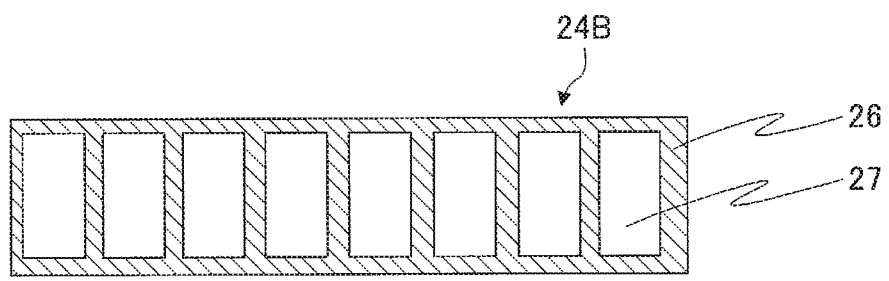
FIG. 8 is a first drawing describing a conductive member according to a third embodiment.
Figure 9:
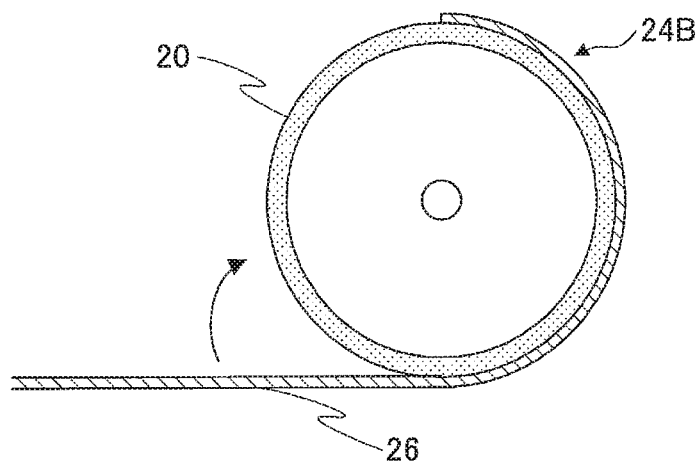
FIG. 9 is a second drawing describing the conductive member according to the third embodiment.

FIG. 8 is the first drawing describing a conductive member 24B according to the third embodiment. FIG. 9 is the second drawing describing the conductive member 24B according to the third embodiment.

As described in FIG. 8, the conductive member 24B according to the third embodiment is a sheet of metallic foil 26, provided with openings 27 that correspond to the magnetic pole pitch of the permanent magnet 23. As described in FIG. 9, the conductive member 24B according to the third embodiment is rolled around the outer circumference of the permanent magnet 23 and then adhered or attached using an adhesive material. In a case where each of the magnetic poles is intended to have a separated closed circuit, the sheet of metallic foil 26 is cut apart after being attached.

In the third embodiment, the single sheet of metallic foil 26 having the openings 27 prepared in advance is rolled around the permanent magnet 23 of the rotor 20 so as to make the conductive member 241B, and therefore a permanent magnet motor with saliency can be manufactured at a low cost.

Fourth Embodiment

In the following, the fourth embodiment will be described with reference to a drawing. In the fourth embodiment, a conductive member 24C differs from the first embodiment. Hence, in the description of the fourth embodiment, the elements having the same configurations as in the first embodiment are assigned with the same reference signs as assigned in the first embodiment, in order to omit repeated explanations.

Figure 10:
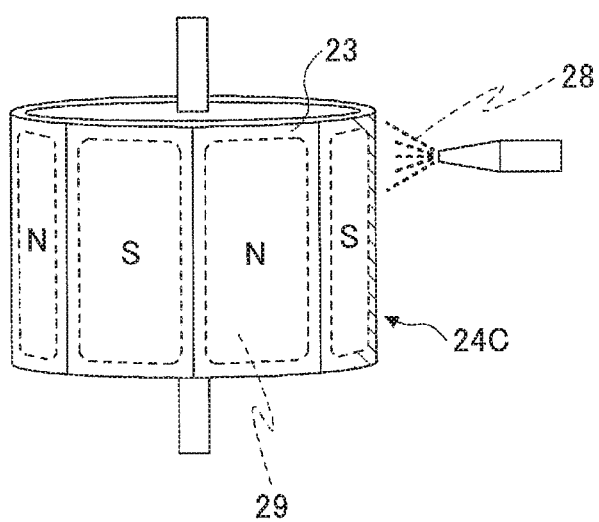
FIG. 10 is a drawing describing a conductive member according to a fourth embodiment.

FIG. 10 is a drawing describing a conductive member 24C according to the fourth embodiment.

The conductive member 24C according to the fourth embodiment is made by the processes of spraying conductive material 28 on the permanent magnet 23 provided with a masking 29 on the regions to become openings, and then removing the masking 29.

In the fourth embodiment, the conductive member 24C is made by the process of spraying the conductive material 28, and therefore a permanent magnet motor with saliency can be manufactured at a lower cost.

Fifth Embodiment

In the following, the fifth embodiment will be described with reference to drawings. In the fifth embodiment, only permanent magnets 23A and 23B differ from the first embodiment. Hence, in the description of the fifth embodiment, the elements having the same configurations as in the first embodiment are assigned with the same reference signs as assigned in the first embodiment, in order to omit repeated explanations.

Figure 11:
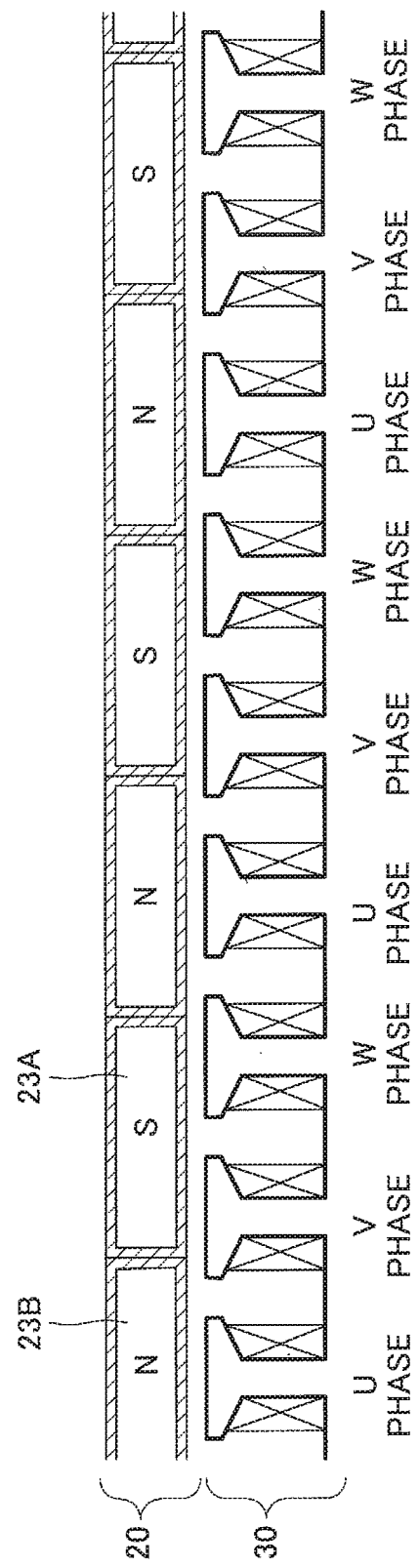
FIG. 11 is a drawing describing a permanent magnet according to a fifth embodiment.

FIG. 11 is a drawing describing permanent magnets 23A and 23B according to the fifth embodiment. The permanent magnets 23A and 23B according to the fifth embodiment have six poles in total. In FIG. 11, the circle of the stator 30 facing the rotor 20 is illustrated as a straight line.

In the fifth embodiment, the stator 30 has nine slots and the permanent magnets 23A and 24B have six poles in total. Therefore, in the fifth embodiment, in view of U-phase coils for example, the three U-phase coils, which are connected in series, face the centers of respective N-poles of the permanent magnets 23B. That is to say, each of the same phase coils has the same positional relationship between the permanent magnets 23A and 23B and the conductive member 24.

The coil inductance described in the first embodiment is affected on a cyclical basis in accordance with the positional relationship between the permanent magnet 23 and the conductive member 24.

Figure 12:
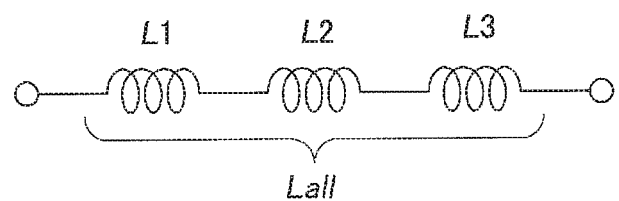
FIG. 12 is a drawing illustrating an inductance of coils connected in series according to the fifth embodiment.

Here, as described in FIG. 12, given that the coil inductances of the three coils connected in series are referred to as L1, L2, and L3, respectively, the integrated inductance Lall is the sum of L1, L2, and L3, as described in Formula 8 below. FIG. 12 is a drawing illustrating inductance of coils connected in series.

[Formula 8]

$$Lall = L1 + L2 + L3 \qquad (8)$$

As indicated in Formula 8, in the fifth embodiment, the coil inductances of the three coils having the same phase enlarge the variation range of the inductance, not weaken each other. Therefore, in the fifth embodiment, a higher saliency ratio is obtained.

As described above, in the fifth embodiment, the number of magnetic poles of the permanent magnet 23 of the permanent magnet motor 10 having three phases is 3n (n is a natural number), and therefore a permanent magnet motor with a high saliency ratio can be manufactured at a low cost.

Sixth Embodiment

In the following, the sixth embodiment will be described with reference to a drawing. In the sixth embodiment, a permanent magnet motor 10A is a two-phase permanent magnet stepping motor. In the following description of the sixth embodiment, the elements having the same configurations as in the first embodiment are assigned with the same reference signs as assigned in the first embodiment, in order to omit repeated explanations.

Figure 13:
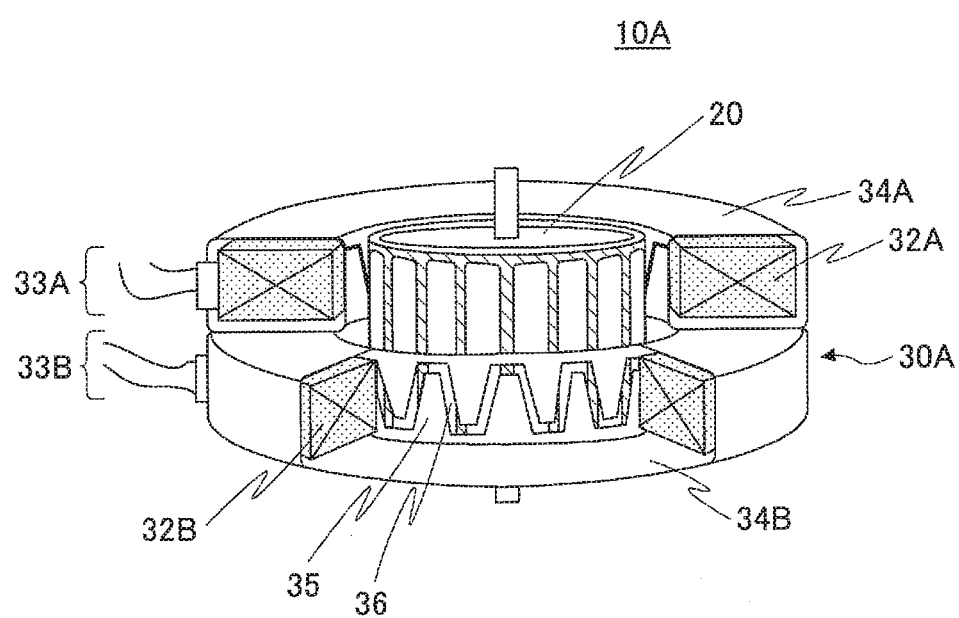
FIG. 13 is a drawing describing a permanent magnet motor according to a sixth embodiment.

FIG. 13 is a drawing describing the permanent magnet motor 10A according to the sixth embodiment. The permanent magnet motor 10A according to the sixth embodiment is a two-phase permanent magnet stepping motor.

The rotor 20 has the same configuration as in the first embodiment, whereas the pitch angle in the arrangement of magnetic poles is the same as the pitch angle of claw poles 35. The claw poles 35, also referred to as teeth, are inductors in a shape of a set of claws arranged in a predetermined pitch.

The stator 30A according to the sixth embodiment is configured with two stacking phases, or an A-phase and a B-phase, one above the other. In FIG. 13, the front half of the A-phase, or the upper phase, of the stator 30A is cut out in the illustration, whereas the front one third of the B-phase, or the lower phase, is cut out in the illustration. However, on the B-phase, the bottom surface and the inner surface facing the rotor 20 of a later-described B-phase yoke 34B are illustrated.

In the following, the configuration of the stator 30A of the sixth embodiment will be described.

An A-phase coil 32A is a coil in the A-phase, wound in a circular direction along the outer circumference of the rotor 20 in a shape of a ring, and the edges of the winding are pulled outside through a coil terminal 33A. Here, the winding type of the winding may be but is not limited to unifilar or bifilar winding, which makes a difference in the direction of electrical current in a coil.

A B-phase coil 32B is the same as in the A-phase, and the A-phase coil 32A and the B-phase coil 32B are independent from each other.

The A-phase yoke 34A is in a shape of a hollow pipe surrounding the A-phase coil 32A, which serves as a case of the A-phase coil 32A. Furthermore, on the surface of the A-phase yoke 34A facing the rotor 20 are provided airspace 36 and claw poles 35 which are in a shape of a claw, configured to engage between the upper and the lower parts in a predetermined pitch.

A B-phase yoke 34B is the same as in the A-phase, except that the claw poles 35 are arranged so as to disagree with the claw poles 35 of the A-phase by one fourth the pitch in the circumferential direction.

As described above, in the sixth embodiment, a stator configured with claw poles is employed, so as not to require a stator core, which is manufactured by layering electromagnetic copper plates, and require only two coils, and therefore a permanent magnet motor with saliency can be manufactured at an even lower cost.

Seventh Embodiment

In the following, the seventh embodiment will be described with reference to drawings. The seventh embodiment relates to a motor driving controlling device 100 provided with the permanent magnet motor 10 described in the first embodiment. In the description of the seventh embodiment, the elements having the same configurations as in the first embodiment are assigned with the same reference signs as assigned in the first embodiment, in order to omit repeated explanations.

Figure 14:
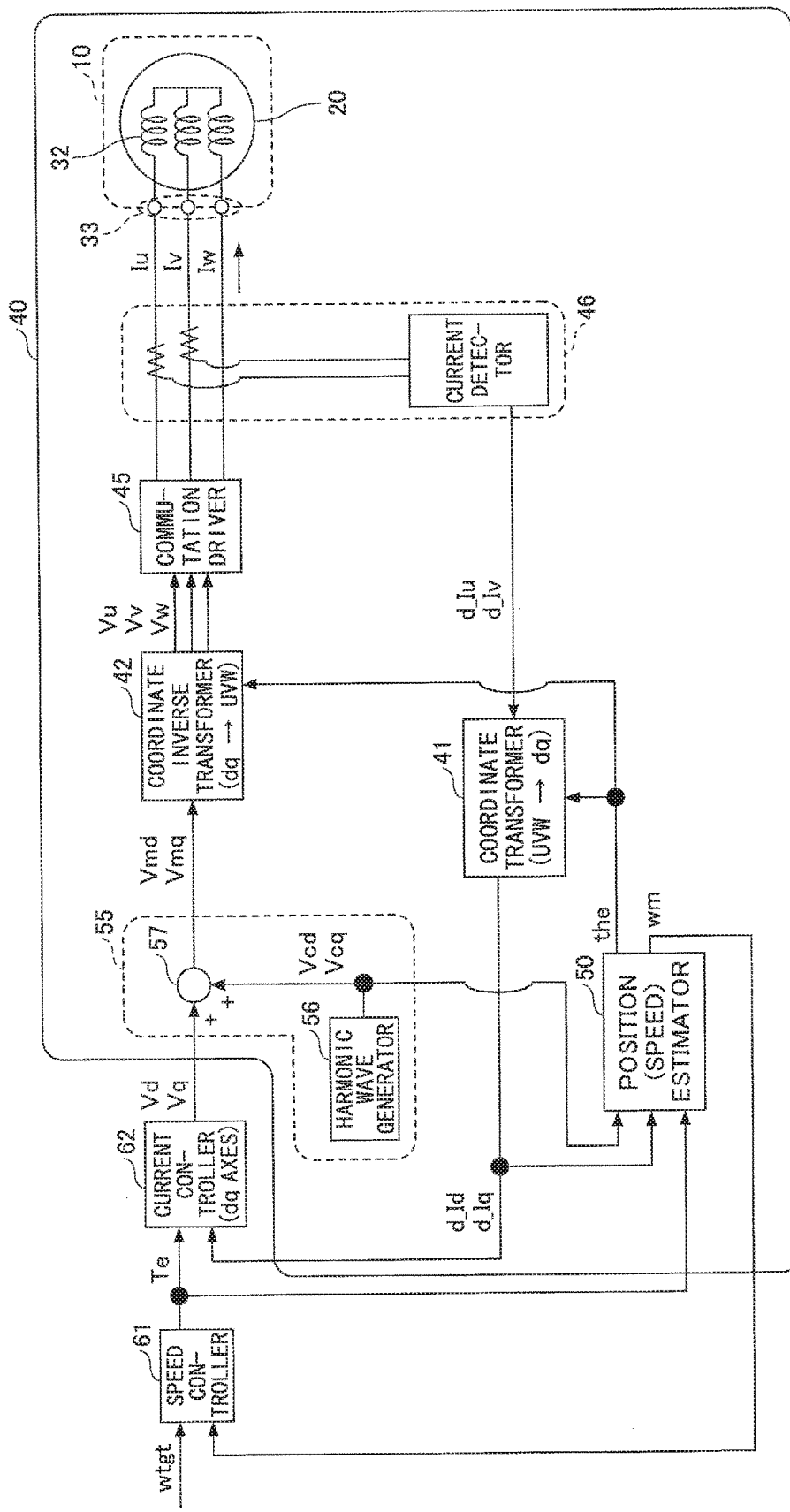
FIG. 14 is a drawing describing a motor driving controlling device according to a seventh embodiment.

FIG. 14 is a drawing describing the motor driving controlling device 100 according to the seventh embodiment. The motor driving controlling device 100 according to the seventh embodiment includes a speed controller 61, a current controller 62, and a position estimating device 40.

The position estimating device 40 according to the seventh embodiment includes the permanent magnet motor 10, a coordinate transformer 41, a coordinate inverse transformer 42, a commutation driver 45, a current detector 46, a position estimator 50, and a harmonic wave superimposing unit 55.

The commutation driver 45 according to the seventh embodiment applies pulse-width modulated voltages to the coil terminals 33, based on later-described phase voltage instruction values Vu, Vv, and Vw, so as to supply currents to the stator coils 32.

The current detector 46 according to the seventh embodiment detects coil currents of the U-phase and the V-phase among the coil currents supplied to the three phases of the stator coils 32, and after performing analog/digital (A/D) conversions, outputs detected current data d_Iu and d_Iv.

Figure 15:
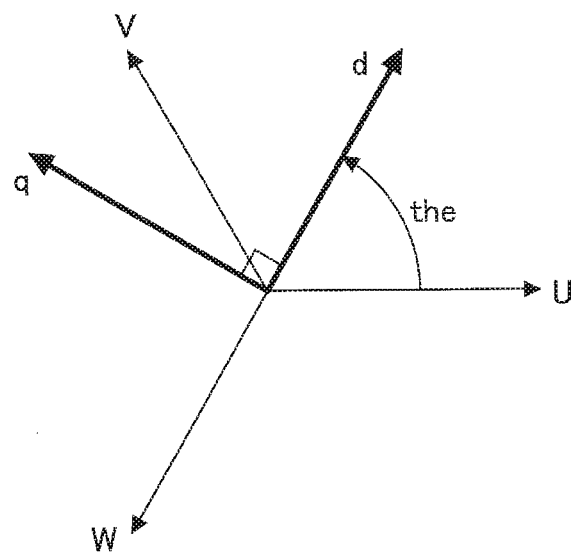
FIG. 15 is a drawing illustrating a definition of a coordinate system according to the seventh embodiment.

The coordinate transformer 41 according to the seventh embodiment performs coordinate transformations of the detected current data d_Iu and d_Iv, from a UVW-axes coordinate system having mutual electric phase differences of 120 degrees as illustrated in FIG. 15 into a dq-axes coordinate system which is a rotating orthogonal coordinate system, where the d-axis is situated at an estimated position the, and then outputs dq-axes detected current data d_Id and d_Iq. FIG. 15 is a drawing illustrating the definition of the coordinate systems according to the seventh embodiment.

The coordinate inverse transformer 42 according to the seventh embodiment performs coordinate inverse transformations of an output instruction value Vmd relating to the d-axis and an output instruction value Vmq relating to the q-axis, on which later-described harmonic waves are superimposed, from the dq-axes coordinate system into the UVW-axes coordinate system as illustrated in FIG. 15. Then, the coordinate inverse transformer 42 outputs the phase voltage instruction values Vu, Vv, and Vw, which are voltage values to be applied to the coil terminals 33 of U, V, and W-phases, respectively.

The position estimator 50 according to the seventh embodiment outputs the estimated position the (corresponding to an electric angle) and an estimated speed wm (corresponding to a mechanical angle) of the rotor 20, based on later-described harmonic wave instruction values Vcd and Vcq, the dq axes detected current data d_Id and d_Iq, and a torque instruction value Te. Details of the position estimator 50 are described hereinafter.

The harmonic wave superimposing unit 55 according to the seventh embodiment includes a harmonic wave generator 56 and an adder 57, so as to generate harmonic wave signals to be superimposed on a later-described controlling output values Vd and Vq, and then output instruction values Vmd and Vmq.

The harmonic wave generator 56 generates the harmonic wave instruction values Vcd and Vcq to be supplied to the d-axis and the q-axis, respectively. The adder 57 adds the harmonic wave instruction values Vcd and Vcq to the controlling output values Vd and Vq, and then outputs the output instruction values Vmd and Vmq. Here, the harmonic wave instruction values Vcd and Vcq in the seventh embodiment refer to harmonic wave signals.

The speed controller 61 according to the seventh embodiment outputs a torque target value Te for achieving a target torque, based on an input from the outside or a predetermined speed target value wtgt and the estimated speed wm (corresponding to a mechanical angle).

The current controller 62 according to the seventh embodiment includes a current target generator (not illustrated) for generating current target values indicating currents to be supplied respectively to the d-axis and the q-axis, as well as proportional-integral controllers (not illustrated) intended for the d-axis and the q-axis, respectively. The proportional-integral controllers according to the seventh embodiment generate the controlling output values Vd and Vq which are instruction values indicating voltages to be applied respectively to the d-axis and the q-axis, based on the current target values intended for the d-axis and the q-axis and the detected current data d_Iu and d_Iv.

Figure 16:
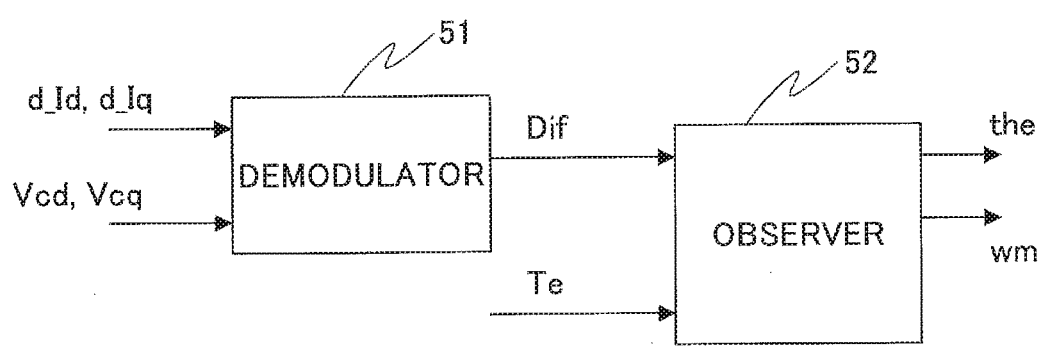
FIG. 16 is a drawing describing a position estimator according to the seventh embodiment.

In the following, the position estimator 50 will be described with reference to FIG. 16. FIG. 16 is a drawing describing the position estimator 50.

The position estimator 50 according to the seventh embodiment includes a demodulator 51 and an observer 52.

The demodulator 51 according to the seventh embodiment extracts a harmonic wave current component, which is obtained as a response to a harmonic wave signal included in the dq-axes detected current data d_Id and d_Iq, using a filter and a multiplier of the harmonic wave instruction values Vcd and Vcq and the dq-axes detected current data d_Id and d_Iq. Then, the demodulator 51 extracts an estimated error Dif, which is an error between the position angle θe (an electric angle) and the estimated position angle the (corresponding an electric angle) of the rotor 20. Here, in order to detect the estimated error Dif, the permanent magnet motor 10 having saliency is required.

The observer 52 outputs the estimated position angle the (corresponding to an electric angle) and the estimated speed wm (corresponding to an mechanical angle) of the rotor 20, based on the estimated error Dif. Here, the harmonic wave current component in the seventh embodiment is a response signal.

As described above, the permanent magnet motor 10 according to the first embodiment is employed in the motor driving controlling device 100 and the position estimating device 40 according to the seventh embodiment, so as to estimate the position of the rotor 20 of the permanent magnet motor 10 without using sensors such as an encoder. Furthermore, according to the seventh embodiment, the motor driving controlling device 100 having the position estimating device 40 can be configured at a low cost.

Further, the same result is obtained even when the permanent magnet motors 10 according to the second through sixth embodiments are employed in the motor driving controlling device 100 and the position estimating device 40 according to the seventh embodiment.

Eighth Embodiment

In the following, the eighth embodiment will be described with reference to drawings. In the eighth embodiment, a conductive member 24D is provided on the rotor 20 of the two-phase permanent magnet stepping motor 10A as described in the sixth embodiment.

Figure 17:
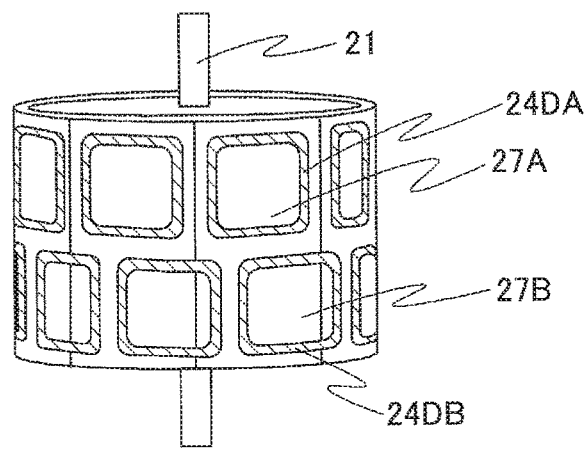
FIG. 17 is a drawing describing a permanent magnet motor according to an eighth embodiment.

FIG. 17 is a drawing describing a permanent magnet motor 10A according to the eighth embodiment. The conductive member 24D according to the eighth embodiment is a non-magnetic electrical conductor attached on the circumferential surface of the permanent magnet 23. As illustrated in FIG. 17, the conductive member 24D according to the eighth embodiment includes a conductive members 24DA and 24DB, which are formed to be cyclic in the rotating direction, facing the A-phase and the B-phase of the stator, respectively. The conductive members 24DA and 24DB respectively have openings 27A and 27B, so as to form electrical closed circuits.

Here, the positions of the conductive members 24DA and 24DB in the circumferential direction corresponding to the positions of the magnetic poles of the permanent magnet 23 are not limited to as described in the eighth embodiment. Further, in the following description, the conductive members 24DA and 24DB are simply referred to as the conductive member 24D unless otherwise specified.

In the eighth embodiment, a non-magnetic electrical conductor is employed, so that the attachment of the conductive members 24DA and 24DB does not significantly affect the magnetic circuit of the permanent magnet motor 10A. Further, as described hereinafter, the permanent magnet motor 10A according to the eighth embodiment obtains saliency responding to the attachment of the conductive members 24DA and 24DB.

Next, the effect of the attachment of the conductive members 24DA and 24DB will be explained, taking the A-phase as an example.

Commonly, a motor with a rotor having a ring-shaped permanent magnet, just as in the eighth embodiment, does not have saliency, which is a property with which a coil inductance changes in accordance with a rotor angle. This is because the permanent magnet is in the shape of a ring, which means that the angle of the rotor does not affect the airspace between the rotor and the stator.

In the following, an emerging of saliency according to the eighth embodiment will be described.

Figure 18:
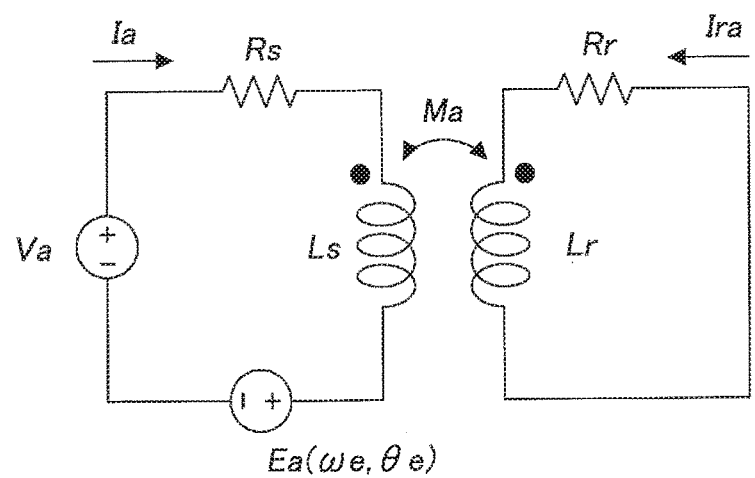
FIG. 18 is a circuit diagram of an A-phase according to the eighth embodiment.

First, a circuit diagram of the A-phase of the permanent magnet motor 10A according to the eighth embodiment will be explained with reference to FIG. 18. FIG. 18 is the circuit diagram of the A-phase. In FIG. 18, the circuit of the stator is on the left. Here, a circuit equation of the stator coil 32A is expressed by Formula 9.

[Formula 9]

$$Va = Rs*Ia + Ls\frac{dIa}{dt} + Ma\frac{dIra}{dt} + Ea(\omega e, \theta e) \quad (9)$$

Here, in Formula 9, Rs is a resistance value of the stator coil 32A, Ls is a coil inductance, Va is a voltage applied to a coil terminal 33A, and Ia is an A-phase coil current supplied to the circuit of the stator. Further, in Formula 9, Ea ($\omega e$, $\theta e$) is an A-phase electromotive force, which is an electromotive force proportional to a rotor speed $\omega e$ and variable in a cycle based on a rotor position angle $\theta e$ (an electric angle), Ma is a mutual-inductance between the circuit of the stator and a closed circuit of the conductive member 24D. Here, the relation between the rotor position angle $\theta e$ (an electric angle) and the rotor speed $\omega e$ is expressed by the Formula 10 below.

[Formula 10]

$$0 = Rr*Ira + Lr\frac{dIra}{dt} + Ma\frac{dIa}{dt} \quad (10)$$

In FIG. 18, the closed circuit of the conductive member 24D is on the right. Here, a circuit equation of the closed circuit of the conductive member 24D is expressed by Formula 11.

[Formula 11]

$$\omega e = \frac{d\theta e}{dt} \quad (11)$$

Here, in Formula 11, Ira is a current supplied to the closed circuit of the conductive member 24D, and Lr is a self-inductance of the closed circuit of the conductive member 24D.

Here, an outline of a sensor-less angle detection using saliency will be described. The method for the sensor-less angle detection is intended to be used when the rotating speed of a motor is in the range of halting to low-speed. Specifically, in the method for the sensor-less angle detection, a harmonic wave signal is superimposed on a voltage for driving a rotation of a motor, and then a harmonic wave current which is included in a coil current as the response to the harmonic wave signal is detected, so as to estimate a rotor positon and a rotor speed based on the harmonic wave signal and the harmonic wave current.

Therefore, considering that the voltage consists mostly of a harmonic wave signal and the rotor speed $\omega e$ is low, Formula 9 and Formula 10 are approximated by Formula 12, after removing from the two formulas the current Ira supplied to the closed circuit of the conductive member 24D. Here, Ldum is an observed inductance.

[Formula 12]

$$Va = \frac{LsLr - Ma^2}{Lr} * \frac{dIa}{dt}, \quad Ldum = \frac{LsLr - Ma^2}{Lr} \quad (12)$$

Next will be explained how a mutual-inductance Ma changes.

The mutual-inductance Ma is affected by the relationship between claw poles 35 and the openings 27A and 27B, and the change is indicated by Formula 13 below.

[Formula 13]

$$Ma(\theta) = M0*\sin(\theta/n) \quad (13)$$

Here, M0 is a variation range of the mutual-inductance, $\theta$ is a rotor angle (a mechanical angle), and n is the number of the conductive members 24D arranged in a circle of the rotor 20 at steady intervals.

Ma is squared in Formula 12. Squared Formula 13 is expressed as Formula 14.

[Formula 14]

$$Ma^2(\theta) = M0^2 * \frac{1 - \cos(2\theta/n)}{2} \tag{14}$$

According to Formula 14, the observed inductance Ldum changes in a cycle, which is indicated by the rotor angle θ divided by the number n of the conductive members 24D in the circle of the rotor 20 and ten multiplied by two. That is to say, the observed inductance of the A-phase coil 32A is affected by the mutual-inductance generated between the stator and the closed circuit of the conductive member 24D, and therefore saliency emerges.

The same is true of the B-phase. A mutual-inductance function Mb(θ) is expressed by Formula 15 below. Here, in Formula 15, the phase difference (a mechanical angle) of the arrangements of the openings 27A and 27B in the circumferential direction of the A-phase and the B-phase is indicated by ρ.

[Formula 15]

$$Mb(\theta) = M0 * \sin((\theta - \rho)/n - \pi/4) \tag{15}$$

As described above, in the eighth embodiment, the conductive members 24DA and 24DB having the independent openings 27A and 27B respectively facing the A-phase and the B-phase of the stator are provided, and therefore observed inductances of the A-phase and the B-phase are generated independently.

Above is the explanation of the effect of the attachment of the conductive members 24DA and 24DB.

The permanent magnet motor 10A according to the eighth embodiment may obtain saliency caused by forms or arrangements of claw poles 35, although an obtained inductance change may not be preferable. According to the method here, the inductance change can be formed into a preferable pattern.

Further, the motor is not limited to an inner rotor type motor as illustrated in the drawings of the eighth embodiment, but also includes an outer rotor type motor.

According the configuration described above, the permanent magnet motor 10A, in which saliency, or preferable saliency, is not obtained, acquires preferable saliency, which is used for a sensor-less angle detection in the range of halting to low-speed.

Figure 19:
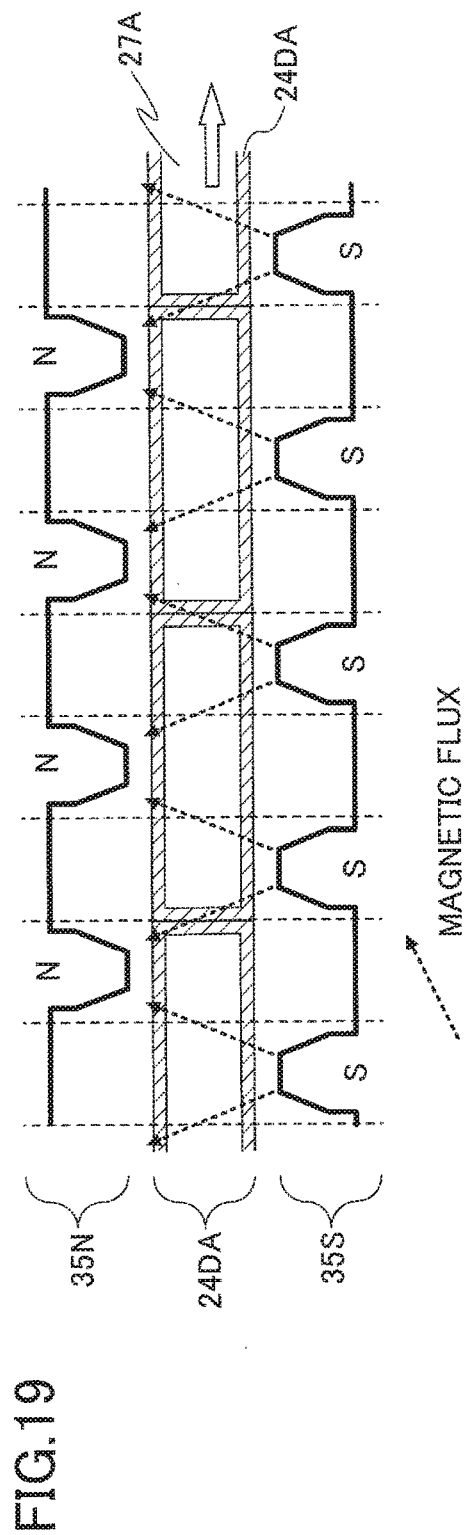
FIG. 19 is a first drawing describing a conductive member according to the eighth embodiment.

Next, the conductive member 24D according to the eighth embodiment will be described with reference to FIG. 19. FIG. 19 is the first drawing describing the conductive member 24D according to the eighth embodiment. Here, FIG. 19 is a drawing illustrating the conductive member 24DA of the conductive members 24D.

The arrangement cycle of the openings 27A of the conductive member 24DA according to the eighth embodiment corresponds to the cycle of an arrangement pitch of the claw poles 35 multiplied by (2N−1). Here, N is a natural number, and the arrangement pitch is the length in the circumferential direction of each of the upper and lower claw poles. FIG. 19 illustrates a case of N=2. Here, the arrangement cycle of the openings 27A is three times longer than the arrangement pitch of upper claw poles 35N and lower claw poles 35S.

FIG. 19 describes one of the two phases, in which the claw poles 35N and 35S and the conductive member 24DA having openings 27A are illustrated in a straight line.

Furthermore, as a matter of convenience for an explanation, the upper claw poles 35N and the lower claw poles 35S are supposed to be magnetized into N and S magnetic poles, respectively, by a coil current.

The change of the mutual-inductance Ma is caused by the change of the total amount of magnetic flux entering an opening (or an interlinkage magnetic flux), while magnetic flux in the direction from the S-pole to N-pole is generated by a stator current Ia. Here, because of the asymmetricity of the N-poles and the S-poles, the interlinkage magnetic flux changes responding to the rotation of the rotor, which changes the phase relationships between the claw poles 35 and the openings 27A. In this way, the mutual-inductance Ma changes based on the rotor angle θ.

Figure 20:
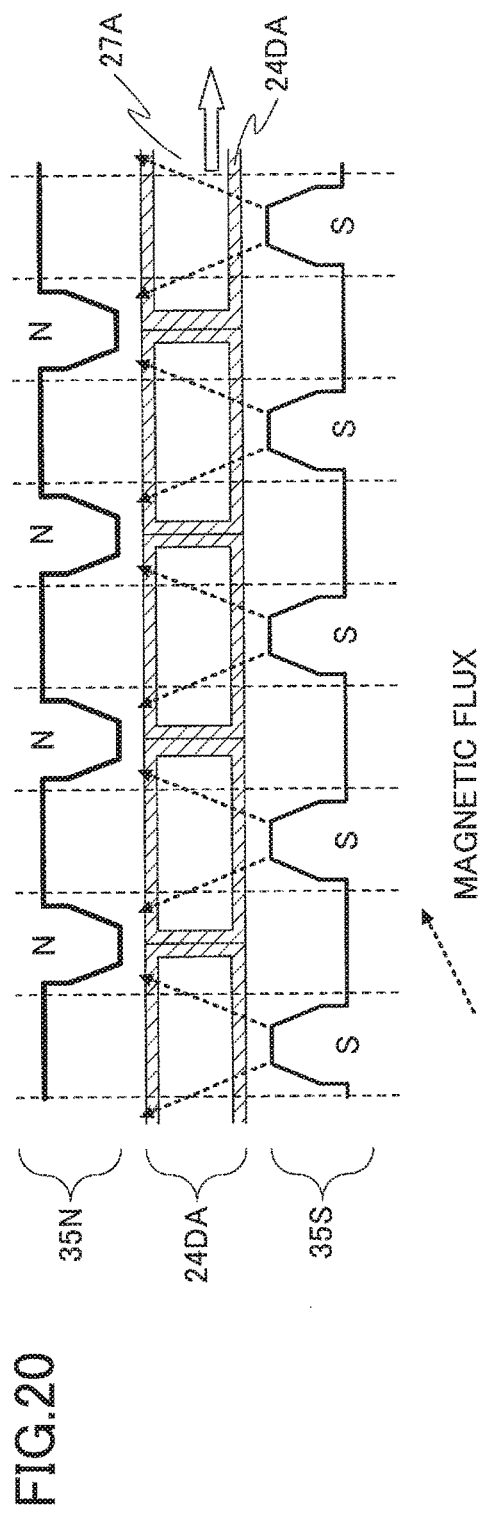
FIG. 20 is a second drawing describing the conductive member according to the eighth embodiment.

Next, with reference to FIG. 20, the case where the arrangement cycle of the openings 27A responding to the cycle of the arrangement pitch of the claw poles will be indicated as 2N (N=1). FIG. 20 is the second drawing describing the conductive member 24D according to the eighth embodiment.

In FIG. 20, although the rotation of the rotor 20 changes the phase relationships between the claw poles 35 and the openings 27A, the increasing and the decreasing amount of magnetic flux entering an opening are the same, and therefore the interlinkage magnetic flux does not change. That is to say, the mutual-inductance Ma does not change based on the rotor angle θ.

In this way, the change is the most significant where the arrangement cycle of the openings 27A responding to the cycle of the arrangement pitch of the claw poles is indicated as (2N−1) (odd number), and the least significant (or none) where indicated as 2N (even number).

As described above, in the eighth embodiment, the arrangement cycle of the openings 27A and 27B of the conductive member 24D responding to the cycle of the arrangement pitch of the claw poles 35 is set to be indicated as (2N−1). Therefore, according the eighth embodiment, the permanent magnet motor 10A having high saliency can be manufactured.

Particularly, in the eighth embodiment, a permanent magnet motor which is configured with stacking stators in the length direction of a shaft, such as the permanent magnet motor 10A, can obtain saliency at a low cost.

Ninth Embodiment

In the following, the ninth embodiment will be described with reference to a drawing. In the ninth embodiment, a conductive member 25D is provided in addition to the conductive member 24D according to the eighth embodiment. In the description of the ninth embodiment, the elements having the same configurations as in the eighth embodiment are assigned with the same reference signs as assigned in the eighth embodiment, in order to omit repeated explanations.

Figure 21:
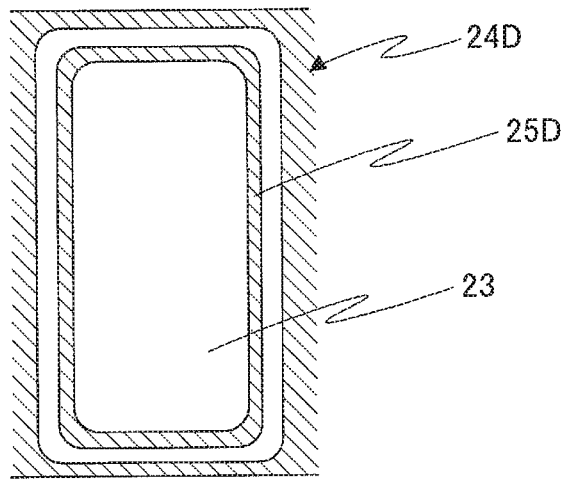
FIG. 21 is a drawing describing a conductive member according to a ninth embodiment.

FIG. 21 is a drawing describing conductive members 24D and 25D according to the ninth embodiment. In the ninth embodiment, the conductive member 25D (another opening in an annular shape) is provided inside the conductive member 24D.

The conductive member 25D is a conductor provided on the surface of the permanent magnet 23 just as the conductive member 24D. The conductive member 25D is in an annular shape arranged inside the openings 27A and 27B of the conductive member 24D, which forms an electrical closed circuit. Here, the number of the conductive members 25D provided inside the conductive members 24DA and DB is not limited to two.

Having the configuration described above, the change of the observed inductance Ldum is more significant in the ninth embodiment, and therefore a signal-to-noise ratio of a sensor-less angle detection is improved. Further, according to the ninth embodiment, inside the conductive member 24D which is in an annular shape and forms an electrical closed circuit, the conductive member 25D which is similarly in an annular shape is provided, and therefore the permanent magnet motor 10A with high observed inductance change can be manufactured at a low cost.

Tenth Embodiment

In the following, the tenth embodiment will be described with reference to drawings. In the tenth embodiment, the elements having the same configurations as in the eighth embodiment are assigned with the same reference signs as assigned in the eighth embodiment, in order to omit repeated explanations.

Figure 22:
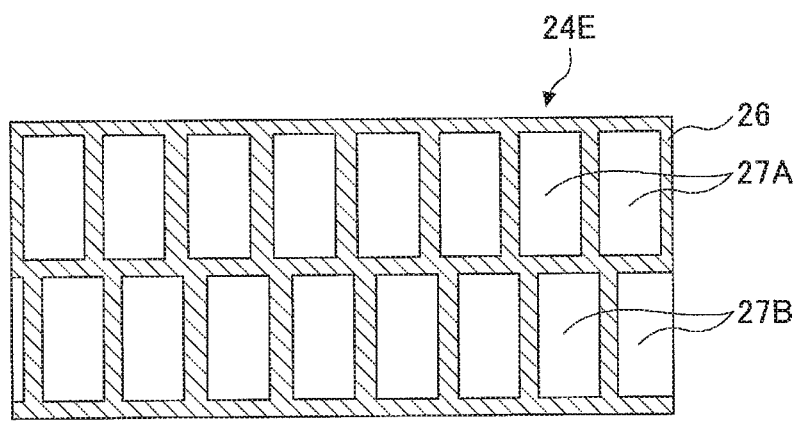
FIG. 22 is a drawing describing a conductive member according to a tenth embodiment.

FIG. 22 is a drawing describing a conductive member 24E according to the tenth embodiment. The conductive member 24E according to the tenth embodiment is formed by a sheet of metallic foil 26.

Figure 23:
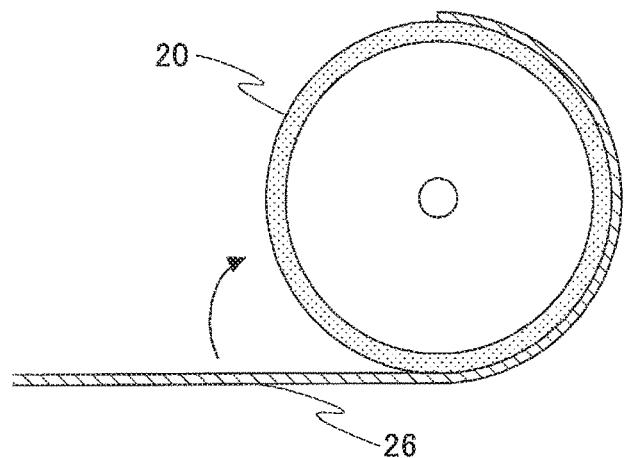
FIG. 23 is a drawing describing attaching of the conductive member according to the tenth embodiment.

As described in FIG. 22, the conductive member 24E according to the tenth embodiment is the sheet of metallic foil 26 provided with openings 27A and 27B and, as described in FIG. 23, the sheet of metallic foil 26 is rolled around the outer circumference of the permanent magnet 23 and then adhered or attached using an adhesive material.

FIG. 23 is a drawing describing attaching of the conductive member 24E according to the tenth embodiment. Here, the openings 27A and 27B are formed so that, after being attached, the openings 27A and 27B align in a single line in the circumferential direction of the rotor 20 at predetermined steady intervals, and are apart from each other so as to correspond, respectively, to the A-phase and the B-phase of the stator. In a case where each of the openings 27A and 27B is intended to be formed by a separated closed circuit made from the conductive member 24E, the sheet of metallic foil 26 is cut apart after being attached.

As described above, in the tenth embodiment, the single sheet of metallic foil 26 having the openings 27A and 27B prepared in advance is rolled around the permanent magnet 23 of the rotor 20 so as to make the conductive member 24E, and therefore a permanent magnet motor with saliency can be manufactured at a low cost.

Eleventh Embodiment

In the following, the eleventh embodiment will be described with reference to a drawing. In the eleventh embodiment, the elements having the same configurations as in the eighth embodiment are assigned with the same reference signs as assigned in the eighth embodiment, in order to omit repeated explanations.

Figure 24:
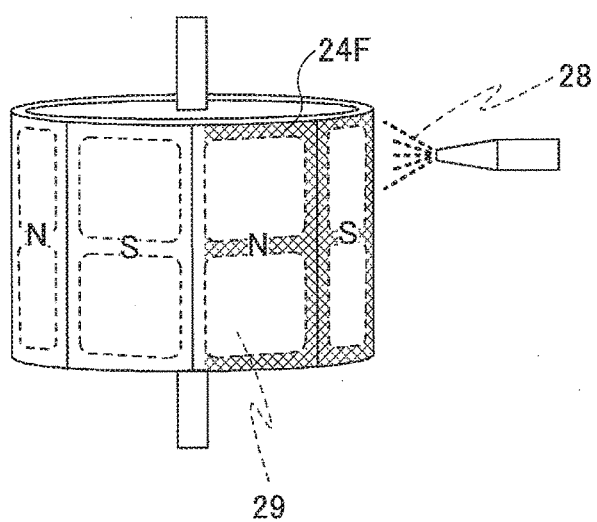
FIG. 24 is a drawing describing a conductive member according to an eleventh embodiment.

FIG. 24 is a drawing describing a conductive member 24F according to the eleventh embodiment. As illustrated in FIG. 24, the conductive member 24F according to the eleventh embodiment is made by the processes of spraying conductive material 28 on the permanent magnet 23 provided with a masking 29 on the regions to become openings 27A and 27B, and then removing the masking 29.

As described above, in the eleventh embodiment, the conductive member 24F is made by the process of spraying the conductive material 28, and therefore a permanent magnet motor with saliency can be manufactured at a low cost.

Twelfth Embodiment

In the following, the twelfth embodiment will be described with reference to drawings. The twelfth embodiment relates to a motor driving controlling device 100A provided with a permanent magnet motor 10A according to the eighth embodiment. In the description of the twelfth embodiment, the elements having the same configurations as in the seventh and eighth embodiments are assigned with the same reference signs as assigned in the seventh and eighth embodiments, in order to omit repeated explanations.

Figure 25:
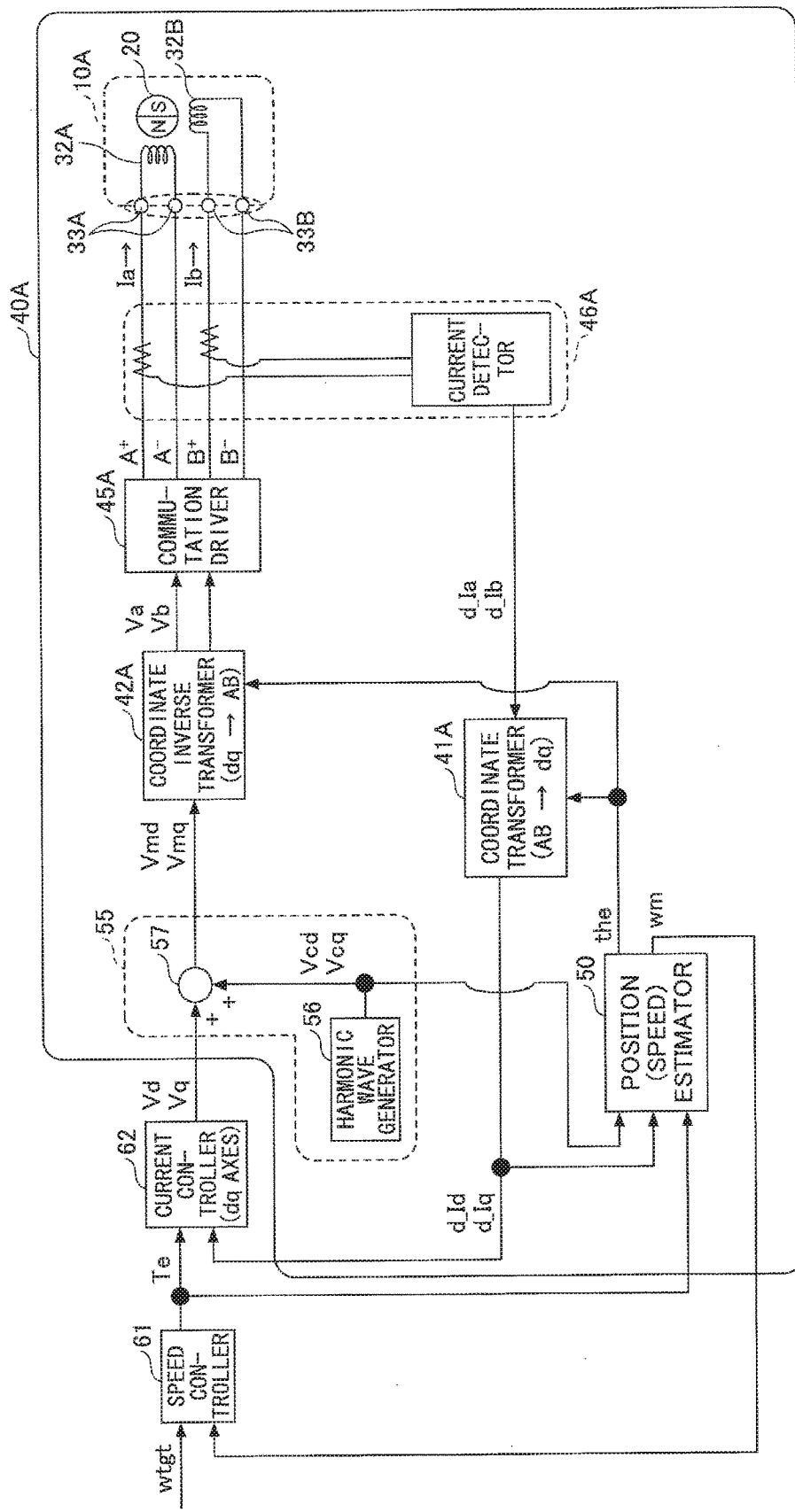
FIG. 25 is a drawing describing a motor driving controlling device according to a twelfth embodiment.

FIG. 25 is a drawing describing the motor driving controlling device 100A according to the twelfth embodiment. The motor driving controlling device 100A according to the twelfth embodiment includes the speed controller 61, the current controller 62, and a position estimating device 40A.

The position estimating device 40A according to the twelfth embodiment includes the permanent magnet motor 10A, a coordinate transformer 41A, a coordinate inverse transformer 42A, a commutation driver 45A, a current detector 46A, the position estimator 50, and the harmonic wave superimposing unit 55.

The commutation driver 45A according to the twelfth embodiment applies pulse-width modulated voltages to coil terminals 33A and 33B, based on the later-described phase voltage instruction values Va and Vb, so as to supply currents to the A-phase coil 32A and the B-phase coil 32B.

The current detector 46A according to the twelfth embodiment detects coil currents Ia and Ib supplied to the A-phase coil 32A and the B-phase coil 32B, and after performing A/D conversions, outputs detected current data d_Ia and d_Ib.

Figure 26:
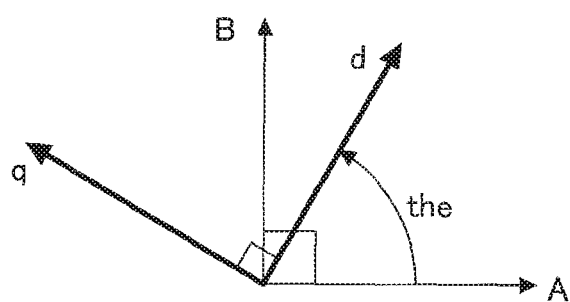
FIG. 26 is a drawing illustrating a definition of a coordinate system according to the twelfth embodiment.

The coordinate transformer 41A performs coordinate transformations of the detected current data d_Ia of the A-phase and the detected current data d_Ib of the B-phase, from an orthogonal AB-axes coordinate system into a dq-axes estimated coordinate system which is a rotating orthogonal coordinate system, where the d-axis is situated at an estimated position angle the, as illustrated in FIG. 26, and then outputs dq-axes detected current data d_Id and d_Iq. FIG. 26 is a drawing illustrating the definition of the coordinate systems according to the twelfth embodiment.

The coordinate inverse transformer 42A performs coordinate inverse transformations of the output instruction value Vmd relating to the d-axis and the output instruction value Vmq relating to the q-axis, on which harmonic waves are superimposed, from the dq-axes coordinate system into the AB-axes coordinate system as illustrated in FIG. 26. Then, the coordinate inverse transformer 42A outputs the phase voltage instruction values Va and Vb, which are voltage values to be applied to the coil terminals 33A and 33B of A-phase and B-phase, respectively.

As described above, in the twelfth embodiment, the permanent magnet motor 10A according to the sixth embodiment is employed in the position estimating device 40A, so as to estimate an angle of the rotor 20 of the permanent magnet motor 10A without using rotation sensors such as an encoder. Furthermore, the motor driving controlling device 100A having the position estimating device 40A can be configured at a low cost.

Thirteenth Embodiment

In the following, the thirteenth embodiment will be described with reference to a drawing. In the thirteenth embodiment, the elements having the same configurations as in the eighth embodiments are assigned with the same reference signs as assigned in the eighth embodiments, in order to omit repeated explanations.

Figure 27:
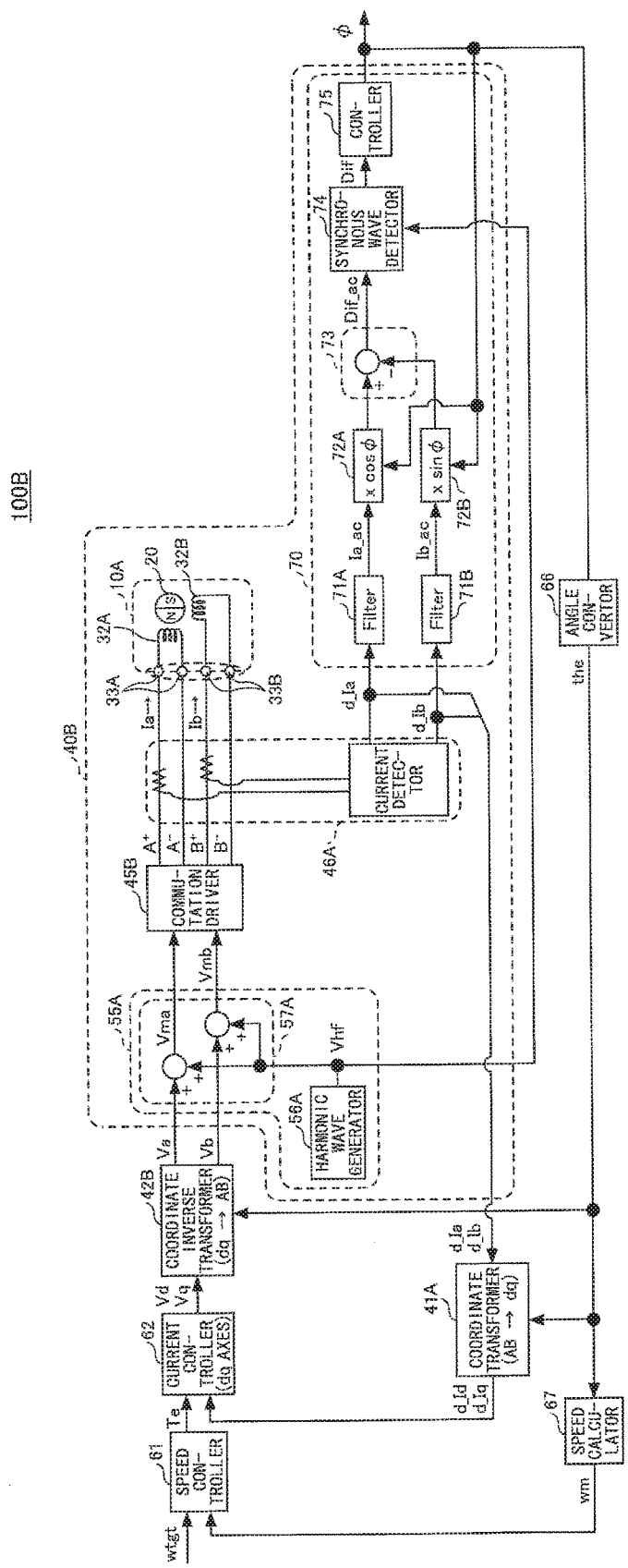
FIG. 27 is a drawing describing a motor driving controlling device according to a thirteenth embodiment.

FIG. 27 is a drawing describing the motor driving controlling device 100B according to the thirteenth embodiment. The motor driving controlling device 100B according to the thirteenth embodiment includes a position estimating device 40B.

The position estimating device 40B according to the thirteenth embodiment includes the permanent magnet motor 10A, a commutation driver 45B, the current detector 46A, a harmonic wave superimposing unit 55A, and a resolver/digital (R/D) convertor 70. The RD convertor 70 detects an angle of the rotor 20. Details of the position estimating device 40B according to the thirteenth embodiment are described later.

Further, the motor driving controlling device 100B according to the thirteenth embodiment includes the speed controller 61, the current controller 62, the coordinate transformer 41A, the coordinate inverse transformer 42B, an angle convertor 66, and a speed calculator 67.

The permanent magnet motor 10A according to the thirteenth embodiment is the same as the twelfth embodiment, except that, in the thirteenth embodiment, the conductive member 24 is arranged in a way that the phase difference of coil currents Ia and Ib is one fourth a cycle.

The coordinate inverse transformer 421B according to the thirteenth embodiment is the same as the coordinate inverse transformer 42A according to the twelfth embodiment, except that, the input signal for the d-axis is a control instruction value Vd and the input signal for the q-axis is a control instruction value Vq.

The angle convertor 66 converts a later-described estimated angle φ (corresponding to an angle in a cycle of the conductive member 24) into the estimated angle the (corresponding to an electric angle) for an output. The estimated angle φ (corresponding to an angle in a cycle of the conductive member 24) is in an n cycle, where n is the number of the openings 27 in one rotation of the rotor 20, and the estimated angle the (corresponding to an electric angle) is in a p cycle, where p is the number of pole pairs in one rotation of the rotor 20.

The speed calculator 67 differentiates the estimated angle the (corresponding to an electric angle) and then divides by the number of pole pairs, or p, which is half the number of the magnetic poles of the permanent magnet 23, so as to output the estimated speed wm (corresponding to a mechanical angle).

Next, each part of the position estimating device 40B according to the thirteenth embodiment will be described.

The harmonic wave superimposing unit 55A according to the thirteenth embodiment includes a harmonic wave generator 56A and an adder 57A, so as to generate harmonic wave signals to be superimposed on a controlling output values Va and Vb, and then output phase voltage instruction values Vma and Vmb as output instructions.

The harmonic wave generator 56A generates a harmonic wave instruction value Vhf, which is a signal having an adequately high frequency comparing to the frequency of a driving current to be applied the coils. The adder 57A adds the harmonic wave instruction value Vhf to the controlling output values Va and Vb, and then outputs the phase voltage instruction values Vma and Vmb. Here, the harmonic wave instruction value Vhf in the thirteenth embodiment is a harmonic wave signal.

The commutation driver 45B according to the thirteenth embodiment is the same as the twelfth embodiment, except that, input signals are the phase voltage instruction values Vma and Vmb. The current detector 46A according to the thirteenth embodiment is the same as the twelfth embodiment The RD convertor 70 according to the thirteenth embodiment has the same configuration as a tracking type RD convertor.

The RD convertor 70 according to the thirteenth embodiment includes filters 71A and 71B, mixers 72A and 721B, a subtracter 73, a synchronous wave detector 74, and a controller 75. The RD convertor 70 according to the thirteenth embodiment outputs the estimated angle φ of the rotor 20, based on the detected current data d_Ia and d_Ib and the harmonic wave instruction value Vhf.

The filters 71A and 71B are provided on the A-phase and the B-phase, respectively. The filters 71A and 71B are a high-pass filter and a band-pass filter, respectively, which extracts a harmonic wave component from the detected current data d_Ia and d_Ib, and outputs modulated current data Ia_ac and Ib_ac.

The mixers 72A and 72B are provided on the A-phase and the B-phase, respectively. The mixers 72A and 72B multiplies a cosine value and a sine value according to the later-described estimated angle φ respectively to the modulated current data Ia_ac and Ib_ac for outputs.

The subtracter 73 subtracts one of the outputs of the mixers 72A and 72B from the other. An output signal of the subtracter 73 includes an estimated error information, which is the discrepancy of the estimated angle φ and the rotor angle θ, modulated as a harmonic wave signal. The subtracter 73 outputs a modulated estimated error Dif_ac.

The synchronous wave detector 74 demodulates the modulated estimated error Dif_ac, based on the harmonic wave instruction value Vhf, and outputs an estimated error Dif.

The controller 75 includes a proportional-integral controller, which calculates for outputting the estimated angle φ so that the estimated error Dif is 0.

As described above, in the thirteenth embodiment, the permanent magnet motor 10A according to the sixth embodiment is employed in the position estimating device 40B, so as to estimate an angle of the rotor 20 of the permanent magnet motor 10A without using rotation sensors such as an encoder. Furthermore, the motor driving controlling device 100B having the position estimating device 40B can be configured at a lower cost.

Further, the present invention is not limited to these embodiments, but various variations and modifications may be made without departing from the scope of the present invention.

As described above, a permanent magnetic motor having saliency is manufactured at a low cost.

What is claimed is:

1. A permanent magnet motor comprising:
a stator including an armature winding configured to form a plurality of phases;
a rotor including a permanent magnet facing the stator, the permanent magnet being in a shape of a ring and having a plurality of magnetic poles in a circumferential direction of the rotor; and
a conductive member made of a conductive material, the conductive member being arranged on a circumferential surface of the permanent magnet facing the stator, the conductive member including a first conductive member on the circumferential surface of the permanent magnet, the first conductive member having a shape on the circumferential surface of the permanent magnet that forms a first electrically closed circuit.

2. The permanent magnet motor according to claim 1, wherein
the armature winding forms three phases, and
a number of the magnetic poles of the permanent magnet is 3n (n is a natural number).

3. The permanent magnet motor according to claim 1, wherein the permanent magnet motor is a permanent magnet stepping motor.

4. The permanent magnet motor according to claim 1, wherein the conductive member has a plurality of shapes such that each of the plurality of shapes forms the first electrically closed circuit in the circumferential direction of the rotor.

5. The permanent magnet motor according to claim 1, wherein the conductive member further comprises:
a second conductive member on the circumferential surface of the permanent magnet such that the second conductive member is surrounded by the first conductive member, the second conductive member having a shape on the circumferential surface of the permanent magnet that forms a second electrically closed circuit inside the shape that forms the first electrically closed circuit.

6. The permanent magnet motor according to claim 1, wherein the permanent magnet is a bond magnet.

7. The permanent magnet motor according to claim 1, wherein the armature winding is configured to receive a harmonic wave signal, and to output a coil current that includes a harmonic wave current component in response to the harmonic wave signal, wherein
a position of the rotor of the permanent magnet motor is estimable based on the harmonic wave signal and the harmonic wave current component.

8. A permanent magnet motor comprising:
a rotor attached to a shaft, the rotor including a permanent magnet having a plurality of magnetic poles in a circumferential direction of rotation;
a plurality of stators each including an armature winding surrounding the rotor and a stator core having a plurality of teeth arranged so as to align in the circumferential direction of rotation, the plurality of stators being at different positions in a length direction of the shaft; and
a plurality of conductive members made of a conductive material, the plurality of conductive members on a surface of the permanent magnet facing the plurality of stators such that each of the plurality of conductive members correspond to the stator core of a respective one of the plurality of stators arranged in a stator stack.

9. The permanent magnet motor according to claim 8, wherein the plurality of conductive members are configured to form an opening in an annular shape on the surface of the permanent magnet facing the plurality of stators.

10. The permanent magnet motor according to claim 8, wherein the permanent magnet motor is a permanent magnet stepping motor.

11. A permanent magnet motor comprising:
a stator including an armature winding configured to form a plurality of phases;
a rotor including a permanent magnet facing the stator, the permanent magnet having a plurality of magnetic poles in a circumferential direction of the rotor; and
a conductive member made of a conductive material, the conductive member being on a surface of the permanent magnet, wherein
the conductive member is a sheet of metallic foil to be attached to the permanent magnet.

12. The permanent magnet motor according to claim 11, wherein the surface of the permanent magnet having the conductive member thereon faces the stator.

13. The permanent magnet motor according to claim 11, wherein the armature winding is configured to receive a harmonic wave signal, and to output a coil current that includes a harmonic wave current component in response to the harmonic wave signal, wherein
a position of the rotor of the permanent magnet motor is estimable based on the harmonic wave signal and the harmonic wave current component.

14. A permanent magnet motor comprising:
a stator including an armature winding configured to form a plurality of phases;
a rotor including a permanent magnet facing the stator, the permanent magnet having a plurality of magnetic poles in a circumferential direction of the rotor; and
a conductive member made of a conductive material, the conductive member being on a surface of the permanent magnet, wherein
the conductive member is formed by use of conductive liquid, paste, or ink which includes non-magnetic metal.

15. The permanent magnet motor according to claim 14, wherein the surface of the permanent magnet having the conductive member thereon faces the stator.

16. The permanent magnet motor according to claim 14, wherein the armature winding is configured to receive a harmonic wave signal, and to output a coil current that includes a harmonic wave current component in response to the harmonic wave signal, wherein
a position of the rotor of the permanent magnet motor is estimable based on the harmonic wave signal and the harmonic wave current component.

17. A motor system comprising:
a permanent magnet motor including a stator, a rotor and a conductive member, the stator including an armature winding configured to form a plurality of phases, the rotor including a permanent magnet facing the stator, the permanent magnet having a plurality of magnetic poles in a circumferential direction of the rotor, and the conductive member being made of a conductive material, the conductive member being on a surface of the permanent magnet facing the stator,
a harmonic wave generator configured to generate a harmonic wave signal to be supplied to the armature winding of the permanent magnet motor;
a current detector configured to detect a harmonic wave current component which is a response to the harmonic wave signal; and
a position estimator configured to estimate a position of the rotor of the permanent magnet motor, based on the harmonic wave signal and the harmonic wave current component.

18. A motor driving controlling device comprising:
the motor system according to claim 17.

* * * * *